Nov. 17, 1970    S. S. FAM    3,540,279
ACOUSTIC SENSING SYSTEM
Filed March 12, 1969    2 Sheets-Sheet 1

INVENTOR.
SHERIF S. FAM
BY Kenway, Jenney & Hildreth
ATTORNEYS

Nov. 17, 1970   S. S. FAM   3,540,279
ACOUSTIC SENSING SYSTEM
Filed March 12, 1969   2 Sheets-Sheet 2

INVENTOR.
SHERIF S. FAM
BY Kenway, Jenney & Hildreth
ATTORNEYS

United States Patent Office 3,540,279
Patented Nov. 17, 1970

3,540,279
ACOUSTIC SENSING SYSTEM
Sherif S. Fam, Lexington, Mass., assignor to Panametrics, Inc., Waltham, Mass., a corporation of Delaware
Filed Mar. 12, 1969, Ser. No. 806,609
Int. Cl. G01k *11/24*
U.S. Cl. 73—339                              7 Claims

ABSTRACT OF THE DISCLOSURE

An acoustic sensing system comprising a lead-in element extending along a first axis, an ultrasonic transducer connected to the lead-in element at one end to excite the lead-in element and to respond to reflections generated in the lead-in element, and one or more sensor elements each having one end connected to the lead-in element and extending from the lead-in element at an angle. Each sensor element is so chosen and constructed that the mode M of wave motion in the lead-in element is converted to a mode N in the sensor element, where mode M is different from mode N.

---

My invention relates to a novel acoustic sensor particularly useful for the measurement of temperature.

The art of measuring various properties of a material by timing the propagation of acoustic signals through the material is highly developed. Since most properties that can be measured in this way, such as Young's modulus, for example, are temperature dependent, in general such measurements are carried out with the specimen at constant temperature. It has also been proposed to measure temperature by observing the propagation of acoustic signals in a known material. Such measurements can be made, for example, by applying an ultrasonic pulse to one end of a material having a series of acoustic impedance discontinuities along its length, and timing the reflections received from those discontinuities in response to the original pulse. However, that approach has the disadvantage that, in the presence of a temperature gradient, the temperature calculated from the measurement is a form of average taken along the sensor. If there is freedom to move the sensor at will, that effect can be compensated for, to some extent, by reorienting the sensor and making a number of measurements in different sensor positions. However, in many instances the necessary rearrangement of apparatus would require considerable experimental effort. And, where measurements in existing apparatus are required, as in nuclear reactors and jet engines, for example, provision for sufficient movement of the sensor might require unacceptable modifications of the apparatus. It is the object of my invention to facilitate the measurement of temperature distributions by the observation of acoustic properties of a known material.

The above and other objects of my invention are attained by a novel sensor construction in which a lead-in element is arranged to be excited in a predetermined mode by an ultrasonic pulse of energy. One or more sensing elements are connected to the lead-in element. The sensing element comprises a material of known properties and length. Its geometry and method of connection to the lead-in element is so chosen that it is more readily excited by the lead-in element in one mode than in other modes. In response to an excitation pulse, echoes are received from the sensing element representing reflections both from the end fixed to the lead-in element and from the free end of the sensing element.

If the sensing element extends at right angles to the axis of the lead-in element, the velocity of acoustic waves propagated in it will reflect conditions along a normal to the sensing element axis. Thus, calculations based on measurements of the velocity of waves propagated in the sensing element will be independent of the temperature gradient along the axis of the lead-in element, though they will reflect any gradient that may exist along the normal. A series of such sensing elements connected at points along the axis of the lead-in element can provide a direct measurement of the gradient along the axis of the lead-in element without movement or relocation of the sensing element. In addition, by simply rotating the lead-in element about its axis, measurements can be made that will reflect the temperature gradient in planes normal to the axis of the lead-in element. By that arrangement, considerably more data can be gathered with a single installation than is possible with a conventional sensor oriented generally along the lead-in axis. As will appear, the apparatus may be variously constructed to make use of vibrations in the several modes in which acoustic waves can be propagated, as well as to take advantage of combinations of vibrational modes for simultaneous measurements at a plurality of points.

The manner in which the apparatus of my invention is constructed, and its mode of operation, will best be understood in the light of the following detailed description, together with the accompanying drawings, of various illustrative embodiments thereof.

In the drawings,

FIG. 9a is a schematic of another embodiment of a sensing element;

FIG. 9b is a graph of voltage versus time for operation of the element of FIG. 9a;

FIG. 10b is a voltage versus time graph for the element of FIG. 10a.

Figure 1:
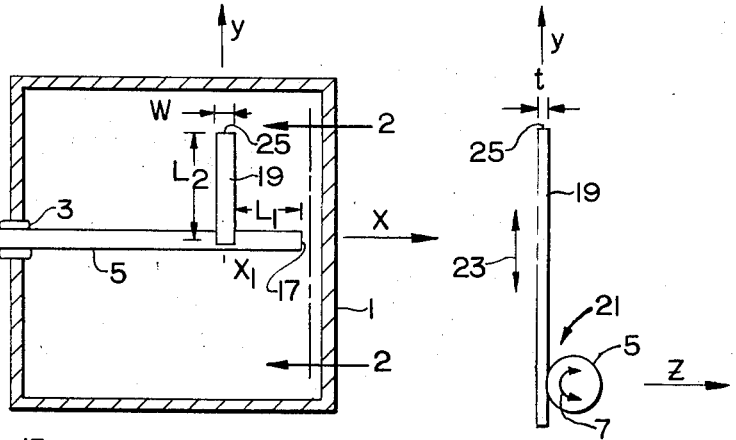
FIG. 1 is a schematic elevational view and wiring diagram of apparatus in accordance with one embodiment of my invention.

Referring to FIG. 1, I have shown an enclosure 1 in which the temperature distribution is to be investigated. Extending into this enclosure 1 through a suitable seal schematically indicated at 3 is a lead-in element 5 of any suitable acoustically transmissive material that may be magnetostrictive, if desired, or may be of any other selected material such as a metal or a crystalline solid.

In FIG. 1, a conventional electro-acoustic transducer 9 is mounted at the outer end of the lead-in element 5 to excite it with torsional waves in a manner known in the art. The transducer 9 may comprise a magnetostrictive element, or a piezoelectric element, arranged in combination with electromagnetic field generating and detecting or receiving means to excite the rod 5 with ultrasonic energy in the range of frequencies usual in acoustic measurements. One hertz is a typical frequency in this range, though both lower and higher frequencies are commonly employed.

The transducer 9 is adapted to function as both an acoustic generator or sensor, in that it is excited by a pulse from excitation circuit 11 to apply acoustic energy to the lead-in element 5, and receives acoustic energy reflected back from discontinuities along the element 5 to produce signals that cause a receiver 13 to activate a display unit schematically shown at 15. The display unit may, for example, comprise a cathode ray oscilloscope.

The receiver 13 will also respond to the primary pulse from the excitation circuit 11, and to secondary signals comprising multiple echoes and the like, which may be gated out, if desired to cause the principal signals of interest to be the only signals displayed on the display unit 15. The details of this portion of the apparatus, being well known to those skilled in the art, will not be further described.

Figure 2:
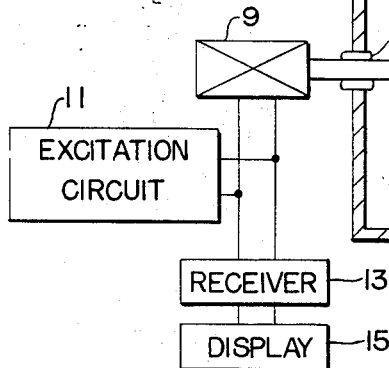
FIG. 2 is an end view of the sensing apparatus forming a portion of the system of FIG. 1, taken substantially along the lines 2—2 in FIG. 1.

Located on the lead-in element 5 at a predetermined effective distance L1 from its end 17 is a sensing element 19 that is bonded to the side of the lead-in element 5, as indicated at 21 in FIG. 2, by welding, brazing, soldering, cementing, or the like, so that it is in acoustic communication with the lead-in element 5.

As shown in FIG. 2 some of the torsional waves, diagrammatically indicated by the curved arrow 7, are converted to extensional waves 23, so that a pulse of energy from the transducer 9 that is propagated as a torsional wave down the lead-in element 5 will have a significant portion converted to an extensional wave and propagated as such in the element 19. On the other hand, the portion of the energy applied by the transducer 9 that is not absorbed in the sensing element 19 but is transmitted to the end 17 of the lead-in element 5 will be propagated as a torsional wave and reflected as such from the end 17. These considerations are important because the dimensions of the apparatus must be selected to distribute the various pulses in time in a convenient manner for detection depending upon the various velocities of propagation of the different modes of vibration. Specifically, extensional waves are propagated at a speed given by $$V_o = \sqrt{\frac{E}{\rho}}$$

where $V_O$ is the velocity of propagation, E is Young's modulus and $\rho$ is density, whereas torsional or shear waves are propagated at a velocity $V_T$ in accordance with the equation $$V_T = \sqrt{\frac{G}{\rho}}$$

where G is the shear modulus.

Figure 3:
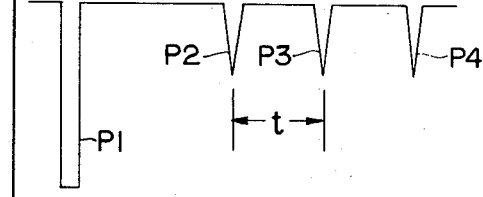
FIG. 3 is a graph of voltage versus time illustrating the operation of the apparatus of FIGS. 1 and 2.

As illustrated in FIG. 3, when a primary excitation pulse P1 is applied to the rod 5 by the transducer 9, it is followed by three reflected pulses P2, P3 and P4 that are returned to the transducer 9, in addition to other secondary pulses that may occur and which may be discriminated against in practice. The pulses may differ in polarity relative to each other depending upon the magnitude of the acoustic impedance of the sensor relative to that of the lead-in. The first of these pulses P2 is a direct reflection from the joint 21 of the sensing element 19 with the lead-in element 5. The arrival of the main pulse at that joint will cause a portion of the energy to be transmitted to the end 17 of the lead-in element 5, and another portion to be converted to an extensional wave that will pass up the element 19 and be reflected from its end 25, thence back to the joint 21 to be reconverted to a torsional wave and transmitted along the lead-in element 5 to the transducer 9. That second reflection from the upper end 25 of the sensing element 19 will produce the pulse P3 in FIG. 3. The dimensions L1 and L2 may be selected, for example, such that the reflection P3 propagated from the end 25 of the element 19 is returned to the transducer 9 before the torsional reflection from the end 17 is returned, the latter producing the pulse P4.

For any particular material of which the sensing element 19 is made, the time $\tau$ between the pulses P2 and P3 in FIG. 3 will be a measure of the mean temperature T of the sensing element 19, the temperature being averaged over the length L2 of the element 19 along the $y$ axis. The temperature T can be computed from the time $\tau$ in accordance with the following considerations:

(1) $$\tau = \frac{2L2}{V_o}$$

(2) $$V_o = V_o = V_o(T)$$

Where $V_O$ (T) is known explicitly, values of T can be found directly from the observed values of $\tau$. However, since L2 is an effective value that may vary somewhat from sensor to sensor depending on the details of the joint between the sensing element 33 and the lead-in element 27, it may be preferred to determine directly by measurements of $\tau$ at a series of known temperatures, and thereby calibrate each sensor directly.

It will be apparent that the temperature measured by the apparatus of FIGS. 1 and 2 in terms of the time $\tau$ between the pulse P2 and P3 will be independent of the temperature distribution along the $x$ axis, but will be dependent in some fashion upon the temperature distribution along the $y$ axis. In many instances there need be considered only a gradient in one direction, (e.g., for $x$ axis) and for the purposes of such measurements the temperature measurement made by the apparatus of FIGS. 1 and 2 will be an effective point measurement. However, where there is a gradient along the $y$ axis that is significant, it may be investigated in detail with little experimental difficulty by simply rotating the lead-in member 5 about its axis $x$, causing the sensing element 19 to assume different orientations in the $y$, $z$ plane of FIG. 2 at which a series of measurements can be made from which the temperature gradient in the $y$, $z$ plane can be estimated with considerable accuracy.

Further information about the distribution of temperature along the $x$ axis can be made without disturbing the apparatus of FIG. 1 by comparing the time $\tau$ between the pulses P2 and P3 with the elapsed time between the pulses P2 and P4, taking into account the fact that the wave propagated along the lead-in element 5 between the element 19 and its end 17 is transmitted as a torsional wave with the velocity $V_T$, whereas the extensional wave in the sensing elements 19 is transmitted at the different velocity $V_O$.

Figure 2A:
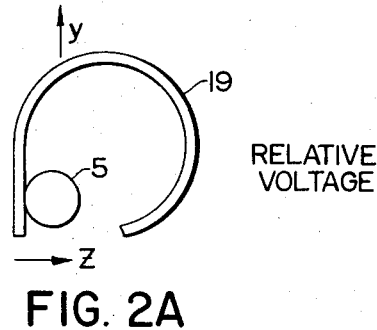
FIG. 2A is an end view of sensing apparatus in accordance with a modification of the apparatus of FIGS. 1 and 2.

As shown in FIG. 2A, the sensing element may be in the form 19a of a coil, to increase its effective acoustic length while reducing the space required to contain it. Of course, measurements with the apparatus of FIG. 2A will be best suited to situations in which there is no appreciable temperature distribution of interest in the $y$, $z$ plane.

Figure 4:
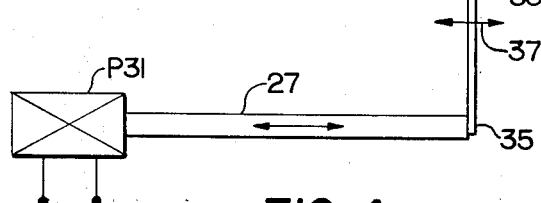
FIG. 4 is an elevational view of sensing apparatus in accordance with a third embodiment of my invention.

FIG. 4 shows an arrangement adapted to make use of the dependence of flexural wave velocity upon temperature. The lead-in element 27 may be similar to the element 5 in FIG. 1. The transducer 31 in this instance is selected to excite the lead-in element 27, and respond to excitations of the lead-in element 27, of the extensional mode.

Figure 5:
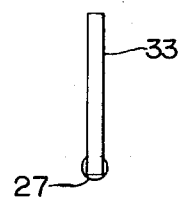
FIG. 5 is an end view of the apparatus of FIG. 4.
Figure 6:
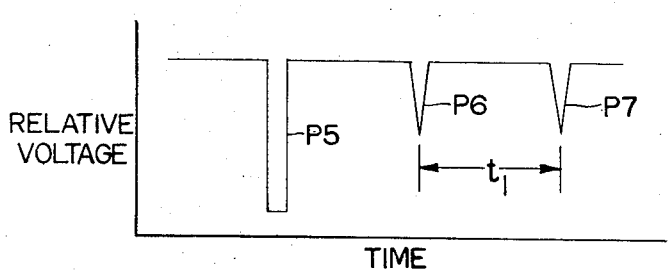
FIG. 6 is a graph of voltage versus time illustrating the operation of the apparatus of FIGS. 4 and 5.
Figure 7:
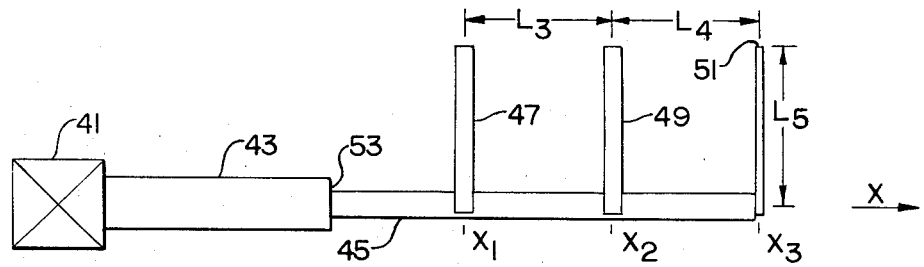
FIG. 7 is a schematic elevational view of another modification of my invention.

In the apparatus of FIGS. 4 and 5, the sensing element 33 may be a thin flat rectangular bar, of a selected material having known properties of acoustic propagation as a function of temperature, secured at right angles to the lead-in element 27 at its end 35. A significant portion of the extensional wave energy propagated along the element 27, illustrated by the symbol 29, will be converted to flexural waves in the element 33, as depicted by the symbol 37. When in operation, as illustrated in FIG. 6, the main pulse P5 will be followed by an echo pulse P6 at the transducer 31 representing a reflection from the end 35 of the lead-in element 27, and a second pulse P7 reflected from the end 39 of the sensing element 33. The time $\tau_1$ between the pulses P6 and P7 will be a measure of the temperature in the element 33 that is calculated in this instance upon the assumption that the wave is propagated in the element 33 as a flexural wave with its corresponding velocity $V_F$. For wavelengths long compared to the lateral dimension $$V_F = \frac{2\pi K V_0}{\lambda}$$

where
K=radius of gyration about the neutral axis
$V_o$=velocity of propagation of extensional waves
$\lambda$=wavelength Referring next to FIG. 7, I have illustrated a modification of the apparatus of my invention in which a temperature distribution may be measured at several points along the sensing axis $x$ without moving the sensing apparatus. As shown, the apparatus comprises a suitable transducer 41 that may be any conventional piezoelectric or magnetostrictive apparatus suitable for exciting an acoustic conductor, illustrated at 43, with both torsional and extensional waves. If desired, two transducers may be employed for this purpose, one for exciting the element 43 with extensional waves, and another for exciting it with torsional waves. Discriminating circuits of any conventional variety may be provided for selectively responding to the pulses and reflection produced by the transducer 41. As shown, a lead-in element 45 may be provided that is not necessarily of the same acoustic impedance as the primary element 43 that is directly connected to the transducer 41.

At selected points $x_1$, $x_2$ and $x_3$ along the lead-in element 45, there are mounted sensing elements 47, 49 and 51. The elements 47 and 49 may be arranged to function in exactly the manner discussed in connection with FIG. 1, to receive a torsional wave propagated along the transducer output element 43 and the lead-in element 45, to reflect the first portion from the end connected to the lead-in element 45, and to return second reflections from the outer and free ends of the elements 47 and 49. The element 51 may be arranged to function in the manner discussed in connection with FIGS. 4, 5 and 6, to produce a pair of reflection pulses at its ends and return them to the transducer 41 in response to a main excitation pulse. The dimensions of the apparatus should be selected so that these various pulses may readily be distinguished and identified, and will not interfere.

Figure 8:
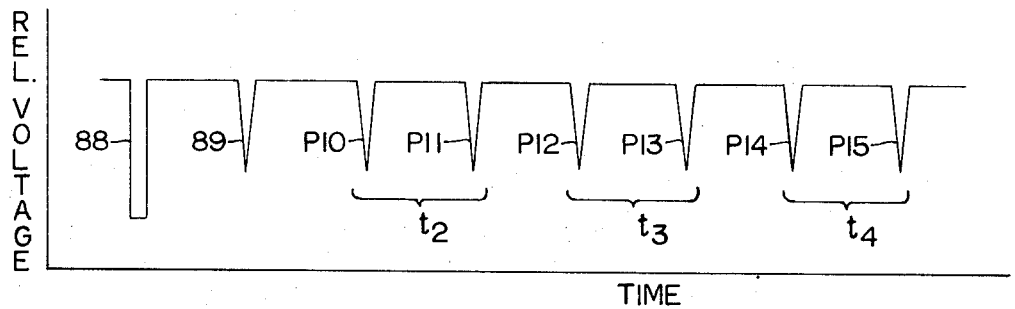
FIG. 8 is a graph of voltage versus time illustrating the operation of the apparatus of FIG. 7.

Referring to FIG. 8, a typical signal distribution produced by the apparatus of FIG. 7 is shown. In response to the main excitation pulse P8, a first reflection pulse P9 is returned from the junction 53 between the elements 43 and 45, due to the difference in their acoustic impedances, that should be ignored, or preferably minimized in practice. Next there is a pulse P10 from the lower end of the element 51, followed by the reflection P11 from its outer end. That establishes a time $\tau_2$ from which the average temperature of the element 51 can be found.

Similarly, a pair of pulses P12 and P13 are produced by the element 47 that establish a time difference $\tau_3$ from which the temperature in the element 47 can be found. While these pulses may be differently distributed by appropriate choice of the parameters L3, L4 and L5, as shown the pulses P10 and P11 occur first, because of the higher velocity of the extensional wave in the lead-in element, but are farther apart than the pulses P12 and P13, because the velocity of the shear wave in the element 51 is lower than the velocity of the extensional wave in the element 47. Finally, there are a pair of pulses P14 and P15 produced by the element 49 that establish a time $\tau_4$ from which, taking into account that it is an extensional velocity with which the wave is propagated in the element 49, the temperature of the element 49 can be determined.

Figures 9A, 9B:
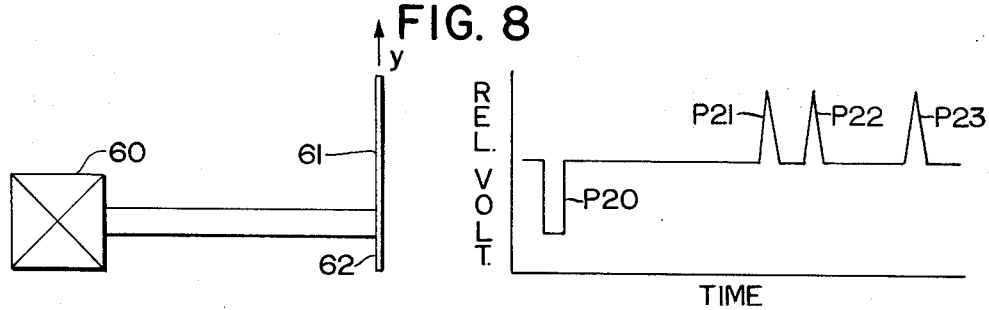

In FIG. 9 a sensor similar to that of FIG. 4 is illustrated. However, in the embodiment of FIG. 9 the sensor is formed in two sections, a long section 61 and a shorter section 62. A significant portion of the extensional wave energy from transducer 60 is mode converted into flexural waves at the sensor 61 and 62. Three echo pulses are thus created, the first echo pulse P21 indicating the arrival of the transmitted pulse at the sensors 61 and 62; the second pulse P22 representing the echo from the short section 62 and the third pulse P23 representing the echo from the longer section 61. The temperature gradient in the $y$ direction can then be obtained by determining the differences in sound velocity along each section.

Figure 10A:
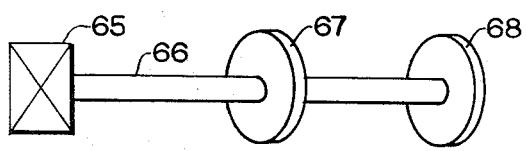
FIG. 10a is a schematic of still another embodiment of sensing element.
Figure 10B:
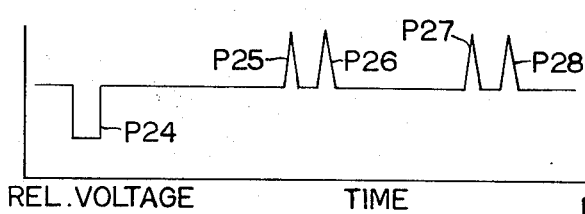

In FIG. 10 an embodiment is illustrated in which the sensors are thin solid disks 67 and 68 attached to the transmitting member 66. A portion of the acoustic energy of the transmitted pulses will be mode converted at each disk and the separation between echos P25 and P26 indicates the temperature at sensor 67 while the separation between pulses P27 and P28 indicates the temperature at sensor 68. The device may be used, with some important modifications, as a calculator or as an encoding and decoding device, wherein the lead-in element is excited in more than one mode which are then converted by the sensing elements and picked up by the transceiver. The response of the system to the excitation modes existing in the lead-in element is equivalent to a mathematical operation performed on the primary excitation, and thus may be used for computational purposes. Also each sensor may be subdivided into a number of sensors by creating acoustical impedance discontinuation so that an acoustic pulse which is propagated along the lead-in element in one mode may be mode converted at the sensor to a second mode, generating a first reflection pulse. As the converted mode acoustic wave travels along the sensor, in a direction away from the axis of the lead-in element, it will generate reflections at each acoustic discontinuity. The time between each of these pulses then indicates the sensed conditions for the different sections of the sensor.

Having thus described my invention, what I claim is:
1. An acoustic sensing system for measuring physical conditions in an area comprising,
  a lead in element of acoustically transmissive material;
  means for transmitting ultrasonic waves in a first mode of vibration along said lead in element,
  a sensing element of specific length formed of a material for which changes of said physical condition in said area result in changes in ultrasonic vibration transmission characteristics, said sensing element being acoustically connected at one end at a substantial angle to said lead-in element and extending into said area, the acoustic impedance of said sensing element and said lead-in element being such that a substantial portion of the ultrasonic energy transmitted along the lead-in element is converted from said first vibration mode to a second vibration mode, and such that a reflection pulse is generated when the ultrasonic wave in the first vibration mode transmitted along said lead in element arrives at the connection between said lead-in element and said sensing element, and
  receiver means for measuring characteristics of reflection pulses returned along said lead whereby the relative characteristics of reflection pulses from said connection and reflection pulses from the distal end of said sensing element provide an indication of the ultrasonic transmission characteristics of said mode converted ultrasonic waves along said sensing element which in turn are indicative of the physical condition to be sensed in said area.

2. The sensing system of claim 1, in which said lead in element comprises a first solid member and in which said sensing element comprises a search member connected to the side of said first member to be excited principally in the longitudinal vibration mode by a torsional vibration wave transmitted along said rod.

3. The sensing system of claim 1, in which said sensing element is connected to the end of said lead in element to be excited principally in a shear vibration mode by an extensional vibration transmitted along said lead-in element.

4. The sensing system of claim 1, in which said sensing element is coiled about said lead in element.

5. A sensor in accordance with claim 1 wherein said angle is substantial 90°.

6. An acoustic sensor for detecting changes in temperature, comprising an ultrasonic transducer for transmitting and receiving acoustic vibrations in a predetermined mode, an acoustically transmissive element connected to said transducer and extending along a first axis, the acoustic transmission characteristics of said second element being variable as a function of temperature and a second acoustically transmissive element connected to said first element and extending at 90° thereto from a first end secured to the first element to a second free end, in which the second element has a cross-section responsive to vibrations in a preferred mode coupled to it by the transducer through the first element, so that upon excitation of the transducer to excite the first element in the preferred vibration mode, a pair of reflections will be received from the second element, one from the end attached to the first element and one from the free end, that will be separated by a time that is a function of the material of the second element and of its temperature along a normal to said first axis.

7. An acoustic sensor assembly comprising:
a lead-in element;
means for generating in said element an acoustic pulse in both a first vibratory mode and a second vibratory mode;
a first sensing element extending transversely from said lead-in element and being connected thereto for converting a substantial portion of the acoustic energy transmitted along said lead-in element in said first vibratory mode to a third vibratory mode for transmission along said first sensing element and for reflection from the distal end thereof, the acoustic transmission characteristics of said first sensing element being variable as a function of a selected parameter; and
a second sensing element extending from said lead-in element at a point spaced from said first sensing element, said second sensing element being connected to said lead-in element for converting a substantial portion of the acoustic energy transmitted along said lead-in element in said second mode to a fourth vibration mode for transmission along said second sensing element and reflection from the distal end thereof, the acoustic transmission characteristics of said second sensing element also being variable as a function of a selected parameter, whereby each of said sensing elements produces a pair of reflection pulses for each transmitted pulse, the relative characteristics of each pair of reflected pulses being variable as a function of the respective parameter.

References Cited

UNITED STATES PATENTS

| | | | |
|---|---|---|---|
| 2,998,723 | 9/1961 | Smith et al. | 73—290 |
| 3,137,169 | 6/1964 | Clement et al. | 73—339 |
| 3,229,523 | 1/1966 | Boyd et al. | 73—290 |
| 3,246,516 | 4/1966 | Maropis | 73—290 |
| 3,350,942 | 11/1967 | Peltola | 73—339 |

LOUIS R. PRINCE, Primary Examiner

F. SHOON, Assistant Examiner

U.S. Cl. X.R.

73—67.8

PO-1050
(5/69)

UNITED STATES PATENT OFFICE
CERTIFICATE OF CORRECTION

Patent No. __3,540,279__  Dated __November 17, 1970__

Inventor(s) __Sherif S. Fam__

It is certified that error appears in the above-identified patent and that said Letters Patent are hereby corrected as shown below:

Column 4, line 15 that portion of the formula readin $V_o = V_o = V_o(T)$ should read $V_o = V_o(T)$ Column 7, line 12 before "transmitted" insert --wave--

Column 7, line 17 change "substantial" to --substantially--

Signed and sealed this 23rd day of March 1971.

(SEAL)
Attest:

EDWARD M. FLETCHER, JR.
Attesting Officer

WILLIAM E. SCHUYLER, JR
Commissioner of Patents